(12) United States Patent  
Nishijima

(10) Patent No.: US 9,092,710 B2  
(45) Date of Patent: Jul. 28, 2015

(54) SEMICONDUCTOR DEVICE

(75) Inventor: Tatsuji Nishijima, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 1143 days.

(21) Appl. No.: 13/050,249

(22) Filed: Mar. 17, 2011

(65) Prior Publication Data

US 2011/0235295 A1   Sep. 29, 2011

(30) Foreign Application Priority Data

Mar. 25, 2010   (JP) ................................. 2010-070528

(51) Int. Cl.
| H05K 7/02 | (2006.01) |
|---|---|
| H05K 7/06 | (2006.01) |
| H05K 7/08 | (2006.01) |
| H05K 7/10 | (2006.01) |
| G06K 19/07 | (2006.01) |

(52) U.S. Cl.
CPC ................... G06K 19/0723 (2013.01)

(58) Field of Classification Search
USPC .................... 361/736–737, 760–784
See application file for complete search history.

(56) References Cited

U.S. PATENT DOCUMENTS

| 6,427,065 | B1 | 7/2002 | Suga et al. |
|---|---|---|---|
| 7,907,902 | B2 | 3/2011 | Kato et al. |
| 8,358,202 | B2 | 1/2013 | Takahashi |
| 2005/0134435 | A1* | 6/2005 | Koyama et al. ............. 340/10.34 |
| 2008/0094180 | A1* | 4/2008 | Kato et al. .................... 340/10.3 |
| 2008/0150475 | A1 | 6/2008 | Kato et al. |
| 2009/0236428 | A1* | 9/2009 | Koyama et al. ............... 235/492 |
| 2010/0072285 | A1* | 3/2010 | Nishijima ...................... 235/492 |
| 2011/0163613 | A1 | 7/2011 | Kato et al. |

FOREIGN PATENT DOCUMENTS

| JP | 61-090511 A | 5/1986 |
|---|---|---|
| JP | 11-053491 A | 2/1999 |
| JP | 2001-260580 | 9/2001 |
| JP | 2008-181499 A | 8/2008 |

* cited by examiner

*Primary Examiner* — Tuan T Dinh  
(74) *Attorney, Agent, or Firm* — Husch Blackwell LLP

(57) ABSTRACT

A passive RF tag has an advantage of being compact and lightweight. However, the driving power is limited. In order to increase the maximum communication distance and the number of objects simultaneously identified, power consumption should be efficient and reduced. The semiconductor device includes an antenna circuit, a modulation circuit electrically connected to the antenna circuit, a filter circuit electrically connected to the modulation circuit, and a logic circuit electrically connected to the filter circuit, in which the modulation circuit includes a first resistor and a transistor, the filter circuit includes a capacitor, one terminal of the first resistor is electrically connected to one of a source and a drain of the transistor, the other terminal of the first resistor is electrically connected to the antenna circuit, and a gate of the transistor is electrically connected to one terminal of the capacitor and the logic circuit.

16 Claims, 15 Drawing Sheets

SEMICONDUCTOR DEVICE

BACKGROUND OF THE INVENTION

1. Field of the Invention

The present invention relates to a semiconductor device which transmits and receives data by wireless communication.

2. Description of the Related Art

In recent years, development of a semiconductor device which can transmit and receive data wirelessly has been proceeding and has attracted great attention. Such a semiconductor device is, for example, an RFID (radio frequency identification), an RF chip, an RF tag, an IC chip, an IC tag, a wireless chip, a wireless tag, an electronic chip, an electronic tag, a wireless processor, or a wireless memory, which has been already introduced into some markets. Among them, a semiconductor device capable of transmitting and receiving data wirelessly for goods management has been developed so as to achieve the following features: compact, lightweight, convenient to use, high-security, and inexpensive. The semiconductor device capable of transmitting and receiving data wirelessly is mounted on a card or the like in some cases for example, and application in a variety of fields has recently been suggested (for example, Patent Document 1).

REFERENCE

[Patent Document 1] Japanese Published Patent Application No. 2001-260580

SUMMARY OF THE INVENTION

Some of the semiconductor devices capable of wirelessly transmitting and receiving data obtain power for driving the circuits in the semiconductor device in such a manner that a DC voltage for driving is generated in the semiconductor device by reception of a carrier wave transmitted from a transmitting and receiving device (an interrogator) such as a reader/writer (a R/W) or an amplitude modulation wave generated by superimposing a modulation wave on a carrier wave. Such a semiconductor device does not include a battery inside. Such a semiconductor device is generally called a passive RF tag or the like. In contrast to the passive RF tags, the semiconductor devices in which a built-in battery provides power required for operating the semiconductor device are called active RF tags.

The passive RF tag has an advantage in that the tag can be compact and lightweight. Therefore, because of its advantage, the passive RF tag has started to be used for management or the like of a large number of items instead of conventional management with a bar code as an individual identification technology in the manufacturing and the distribution fields, and has been developed to be applied also to personal identification. From such a situation of these days, application of the passive RF tag to various fields can be expected by increasing the maximum communication distance and the number of objects simultaneously identified.

The passive RF tag generates driving power by receiving a carrier wave transmitted from a R/W; thus, improvement in power consumption efficiency and reduction of power consumption in the semiconductor device are required in order to increase the maximum communication distance and the number of objects simultaneously identified.

FIGS. 2 and 3 show peripheral circuits of an antenna of a general passive RF tag in which a load modulation method is used for its modulation circuit. An antenna circuit 102, a modulation circuit 105, a circuit 201 which is part of a logic circuit outputting a response signal 233 (a circuit of an output portion of a logic circuit), and a signal 232 which is the modulated response signal 233 outputting from the logic circuit and transmitted to a R/W are shown.

FIG. 2 shows the circuit when a transistor 212 is on, and FIG. 3 shows the circuit when the transistor 212 is off.

The frequency of the signal 231 output from the antenna circuit 102 which receives a wireless signal is largely different from the frequency of the response signal 233 output from the logic circuit. The frequency of the signal 231 is generally far higher than that of the response signal 233. Note that although the signal 231, the signal 232, and the response signal 233 are shown in FIGS. 2 and 3, they are omitted in the drawings described below.

Under such a condition, an AC leakage (an AC leakage 234) is generated, which flows from an AC circuit such as an antenna circuit to a DC circuit (or an AC circuit which can be considered as a DC circuit) such as a logic circuit.

This AC leakage 234 is generated in such a manner that a voltage amplitude of the signal 231 is transmitted to a gate of the transistor 212 through parasitic capacitance formed between the gate and a drain of the transistor 212 and between the gate and a source. Moreover, the AC leakage 234 is generated at all times regardless of on or off of the transistor 212.

In the passive RF tag in which driving power is obtained from a carrier wave, the voltage amplitude of the signal 231 is as large as that of a DC voltage generated inside, and the AC leakage 234 becomes a noise which is not negligible in view of the circuit driving even when the parasitic capacitance of the transistor 212 is small.

In FIGS. 2 and 3, the AC leakage 234 flows into an element such as a transistor or a resistor of the circuit 201 which is part of the logic circuit, and is consumed as power which is not involved in driving or the like of the semiconductor device. The AC leakage 234 is consumed as power which is not involved in driving or the like of the semiconductor device, and therefore is a big cause of increasing power consumption of the semiconductor device.

In the case of an AC current such as the AC leakage 234, the power consumption can be regarded as the average power which is obtained in such a manner that the product of the instantaneous voltage and the instantaneous current is integrated in the range of one cycle of the AC current, and the integration is divided by the cycle.

When a current flows to a resistance element such as a resistor, electric energy is converted into another form of energy such as thermal energy. Therefore, the resistance element constantly consumes power. In addition to the resistor, a region between a source and a drain of a MOS transistor, a diode, or the like can be given as the resistance element.

In contrast, the capacitor in the AC circuit instantly consumes power in simulation; however, the average power per cycle becomes zero. This is because that a reactance element such as a capacitor has a property to store energy and discharge the stored energy. Therefore, in the AC circuit, the reactance element such as a capacitor does not consume power. In other words, a reactance element included in a circuit of a semiconductor device or the like is regarded as an element which does not consume power which is not involved in driving or the like of the circuit.

Therefore, in order to solve the above problems, a structure is preferable in which the AC leakage 234 is prevented from flowing into an element of a transistor or the like such as a logic circuit and flows into a reactance element such as a capacitor.

In addition, FIG. 4 shows a circuit diagram illustrating that a capacitor 402 is electrically connected between B and C and a resistor 401 is electrically connected between B and D. Here, a way in which the AC current flows when an input voltage is applied between A and E and an AC current I flows is described.

The amount of AC current can be estimated by Ohm's law with the use of the input voltage and each impedance of the two elements shown in FIG. 4. For example, in the case where the impedance of the resistor 401 is 100 kΩ, the impedance of the capacitor 402 is 1 kΩ, and the input voltage is 1V, the AC current flowing in the resistor 401 is $1 \times 10^{-5}$ A, and the AC current flowing in the capacitor 402 is $1 \times 10^{-3}$ A. The current flows more into the element which has lower impedance. In this case, there is a large gap between the impedance of the resistor 401 and the capacitor 402; therefore, the AC current hardly flows into the resistor 401. In other words, the AC current flows preferentially to the side of lower impedance as its property when the current is divided. In the case of FIG. 4, the AC current flows preferentially through the route BC.

Therefore, in FIGS. 2 and 3, in order to prevent the AC leakage 234 from flowing into an element of a transistor or the like such as the circuit 201, it is preferable that the AC leakage 234 be prevented from flowing into a SEND terminal of the circuit 201 by providing an additional divided route between a gate of the transistor 212 and the SEND terminal of the circuit 201. As a more preferable structure, an element having low impedance is provided in the provided additional route so that the AC leakage easily flows to the provided additional route. Specifically, as an element having low impedance which is provided in the additional route, a reactance element such as a capacitor is preferable.

A structure of FIG. 5 was considered as an embodiment of a structure in which the AC leakage 234 is prevented from flowing into an element of a transistor or the like such as the circuit 201. In FIG. 5, the gate of the transistor 212 is electrically connected to one terminal of the capacitor 514 and the SEND terminal of the circuit 201 in the filter circuit 506. In other words, FIG. 5 shows a structure in which the additional divided route is provided between the transistor 212 and the SEND terminal of the circuit 201 so that the AC leakage 234 does not flow into the circuit 201. Note that the SEND terminal of the circuit 201 corresponds to an output terminal of a logic circuit 101.

The way in which the AC leakage 234 flows in a structure shown in FIG. 5 is described with reference to FIG. 6. FIG. 6 shows that the AC leakage flows more between B and C by providing the impedance of the route BC which is the additional route so that the impedance is lower than impedance of the SEND terminal of the circuit 201 of a route BD. A capacitor 514 is provided between B and C. Therefore, an AC leakage 518 flowing into the route BC is not consumed as power. Consequently, power consumption which is not involved in driving or the like of the semiconductor device can be reduced.

With such a circuit structure, power consumption which is not involved in driving or the like of the semiconductor device is reduced, and power generated in the semiconductor device is effectively supplied to a circuit which contributes to driving of the semiconductor device such as a logic circuit. Accordingly, the semiconductor device can be driven with lower power than the conventional one.

According to an embodiment of the present invention, a semiconductor device includes an antenna circuit, a first resistor, a transistor, a capacitor, a logic circuit, a first constant-voltage power supply line, and a second constant-voltage power supply line, in which one terminal of the first resistor is electrically connected to one of a source and a drain of the transistor, the other terminal of the first resistor is electrically connected to the antenna circuit, the other one of the source and the drain of the transistor is electrically connected to the first constant-voltage power supply line, a gate of the transistor is electrically connected to one terminal of the capacitor and the logic circuit, and the other terminal of the capacitor is electrically connected to the second constant-voltage power supply line.

According to another embodiment of the present invention, a semiconductor device includes an antenna circuit, a first resistor, a second resistor, a transistor, a capacitor, a logic circuit, a first constant-voltage power supply line, and a second constant-voltage power supply line, in which one terminal of the first resistor is electrically connected to one of a source and a drain of the transistor, the other terminal of the first resistor is electrically connected to the antenna circuit, a gate of the transistor is electrically connected to one terminal of the capacitor and one terminal of the second resistor, the other one of the source and the drain of the transistor is electrically connected to the first constant-voltage power supply line, the other terminal of the second resistor is electrically connected to the logic circuit, and the other terminal of the capacitor is electrically connected to the second constant-voltage power supply line.

In the above semiconductor device according to an embodiment of the present invention, impedance of the capacitor is at least lower than combined impedance of the second resistor and the logic circuit.

In the above semiconductor device according to an embodiment of the present invention, a wiring is provided which electrically connects the antenna circuit and the logic circuit to the first constant-voltage power supply line.

In the above semiconductor device according to an embodiment of the present invention, the first constant-voltage power supply line and the second constant-voltage power supply line are electrically connected to each other. Note that the constant-voltage power supply line refers to a wiring to which a constant voltage is applied or a ground wiring.

With the use of the semiconductor device according to an embodiment of the present invention, an AC leakage from a modulation circuit 105 to a circuit 201 which is part of a logic circuit is reduced and is not consumed as power which is not involved in driving or the like of the semiconductor device; thus, improvement in power consumption efficiency and power consumption reduction of the semiconductor device can be achieved. As a result, the semiconductor device can be driven at lower power and the characteristics such as a communication distance or the number of objects simultaneously identified can be largely improved.

DETAILED DESCRIPTION OF THE INVENTION

Figure 1:
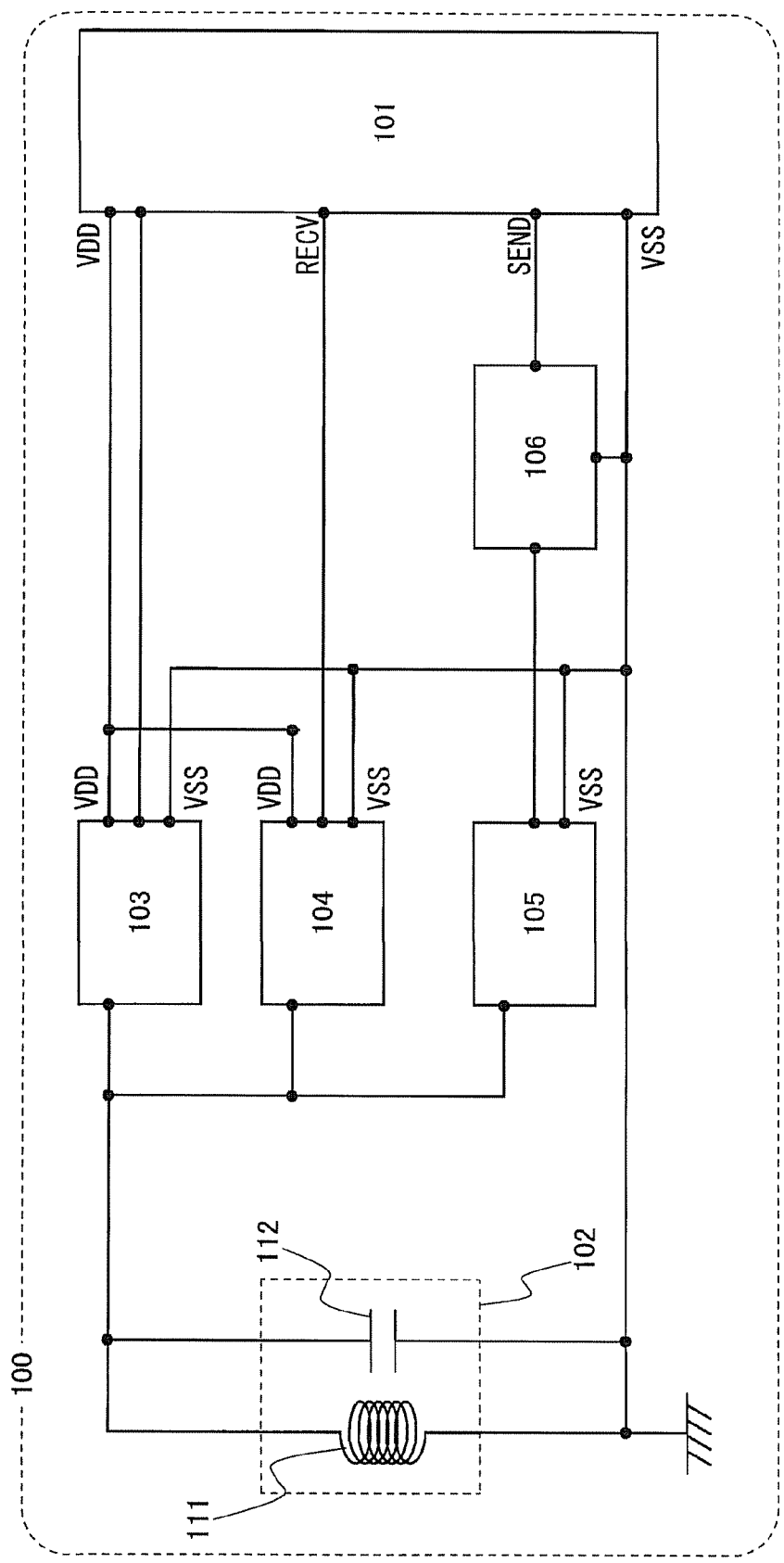
FIG. 1 is a block diagram of a semiconductor device according to an embodiment of the present invention.

A semiconductor device according to an embodiment of the present invention includes various circuits such as an antenna circuit, a power supply circuit, a demodulation circuit, a modulation circuit, a filter circuit, and a logic circuit, for example, as its configuration; however, a relation of an antenna circuit, a modulation circuit, a filter circuit, and a logic circuit is only described in the description below.

Embodiments and an example are described in detail with reference to the drawings below. Note that the present invention is not limited to the description of the embodiments and the example below, and it is apparent to those skilled in the art that the modes and details can be modified in various ways without departing from the spirit of the present invention disclosed in this specification and the like. A structure of different embodiments can be implemented by combination appropriately. Note that the same portion or a portion having the same function is denoted by the same reference numeral in the structures of the present invention described below, and the repetitive explanation thereof is omitted. In addition, a semiconductor device in this specification indicates all devices that operate by utilizing semiconductor characteristics.

Embodiment 1

FIG. 1 shows a semiconductor device according to an embodiment of the present invention. A semiconductor device 100 includes a logic circuit 101 for performing processing such as generating a response signal based on received data, an antenna circuit 102 for transmitting and receiving signals to/from a R/W, a power supply circuit 103 for generating a DC voltage from a carrier wave or a modulated wave which is received by the antenna circuit 102, a demodulation circuit 104 for extracting a baseband signal which is from a R/W by demodulating a modulated wave received by the antenna circuit 102, a modulation circuit 105 for modulating and converting a response signal output from the logic circuit 101 into a signal which is to be transmitted to a R/W, and a filter circuit 106 for blocking leakage of AC current flowing from the modulation circuit 105 to the logic circuit 101.

The antenna circuit 102 includes an antenna 111 and a resonant capacitor 112. As for the antenna 111, its capability of receiving a carrier wave from a R/W varies depending on its shape, a transmission system such as an electromagnetic induction system or an electric wave system, and the frequency band of a carrier wave; however, the antenna 111 is not specified here. The resonant capacitor 112 is combined with the antenna 111 to optimize the resonance frequency of the antenna circuit 102 approximately to the frequency of the carrier wave from the R/W.

The power supply circuit 103 includes a rectifier circuit for rectifying a carrier wave or a modulated wave received by the antenna circuit 102 and generating an envelope voltage Venv which is a DC voltage. As the rectifier circuit, a half-wave rectifier circuit, a half-wave voltage-doubler rectifier circuit, a full-wave rectifier circuit, a full-wave voltage-doubler rectifier circuit, a bridge rectifier circuit, or the like can be used; however, the rectifier circuit is not specified here.

The power supply circuit 103 may include a constant-voltage circuit, which adjusts Venv to be prevented from being well over a desired voltage, and supplies a constant voltage to the logic circuit 101 and the demodulation circuit 104 as a driving voltage (VDD). In the case where a constant-voltage circuit is not provided, the power supply circuit supplies an envelope voltage Venv as a driving voltage (VDD).

Figure 5:
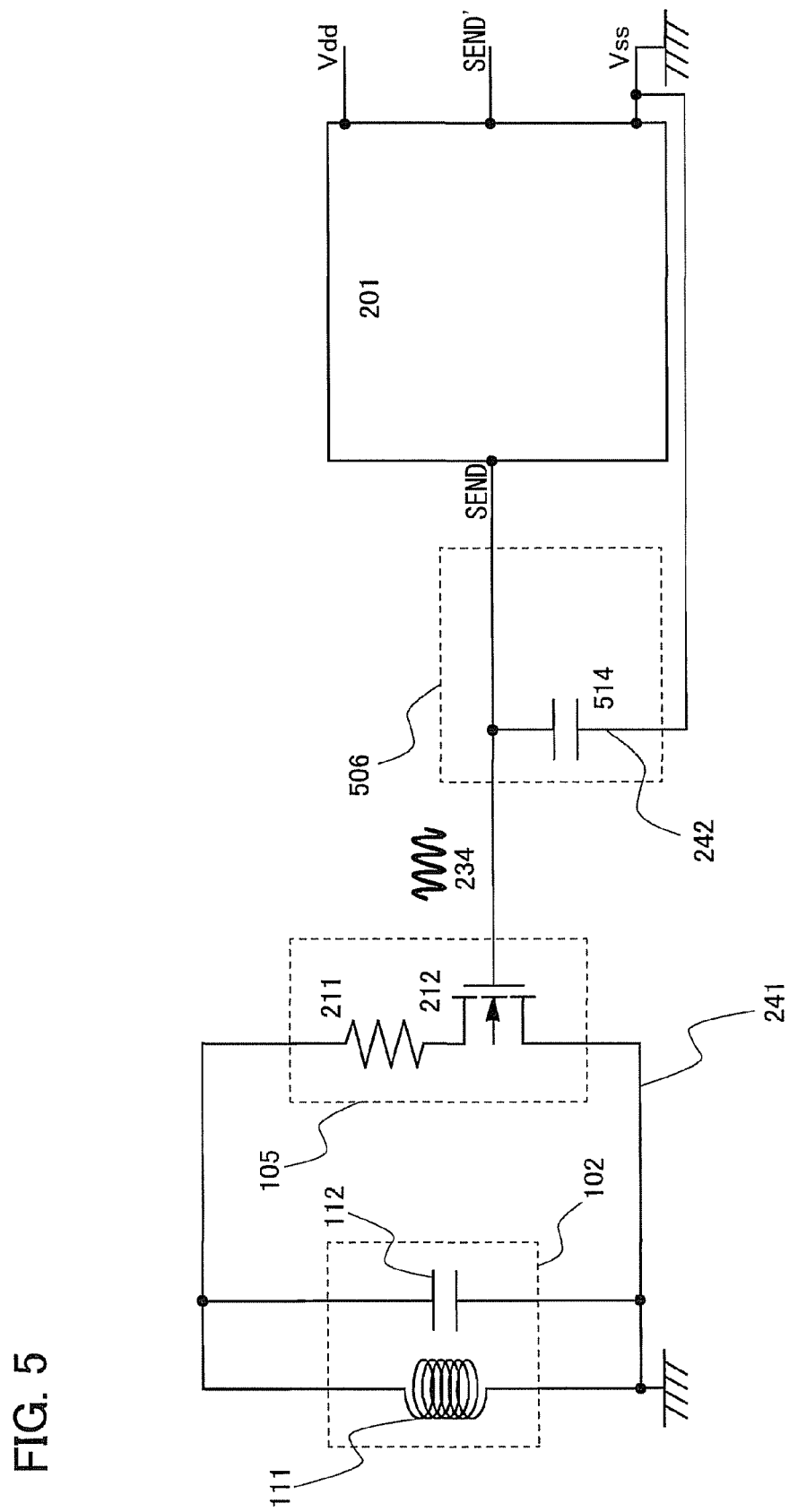
FIG. 5 is a peripheral circuit diagram of an antenna of a semiconductor device according to an embodiment of the present invention.

In addition, FIG. 5 is a peripheral circuit diagram of the antenna included in a semiconductor device according to an embodiment of the present invention shown in FIG. 1. The antenna circuit 102, a modulation circuit 105, a filter circuit 506, and a circuit 201 are illustrated. Note that the circuit 201 is a circuit of an output portion of a logic circuit.

In the case where the semiconductor device 100 transmits data such as a response signal outside, the logic circuit 101 inputs a response signal 233 into the modulation circuit 105. Depending on what a modulation system is applied to the semiconductor device 100, a modulated sub-carrier wave which is made by superposing the response signal 233 on a sub-carrier wave is input into the modulation circuit 105 instead of this response signal 233 in some cases; however, they are regarded as the same in this embodiment. In FIG. 5, the response signal 233 is input from a SEND terminal of the circuit 201 to the modulation circuit 105 through the filter circuit 506.

The modulation circuit 105 is a load modulation circuit which is connected to the antenna circuit 102, and changes the impedance between the two terminals of the antenna 111 in accordance with the level of the input signal. Thus, for example, a voltage level of a carrier wave of the antenna in the outside device which is electromagnetically coupled with the antenna 111 is changed in a wireless communication system with an electromagnetic induction method, and a current level of a carrier wave reflected on the antenna 111 is changed in a wireless communication system with an electric wave method. The R/W recognizes data transmitted by the logic circuit by detecting and analyzing the changed voltage level or current level of the carrier wave.

The modulation circuit 105 includes a resistor 211 and a transistor 212 as shown in FIG. 5. In the modulation circuit 105, the antenna circuit 102 and one terminal of the resistor 211 are connected to each other and the other terminal of the resistor 211 and one of a source and a drain of the transistor 212 are connected to each other.

In the filter circuit 506, a capacitor 514 is provided. A gate of the transistor 212 is electrically connected to one terminal of the capacitor 514 and a SEND terminal of the circuit 201, and the other terminal of the capacitor 514 is connected to a wiring 242. In other words, an additional route which branches off between the transistor 212 and the SEND terminal of the circuit 201 is provided so that an AC leakage 234 does not flow into the circuit 201 which is part of the logic circuit through the gate of the transistor 212 and the SEND terminal of the circuit 201.

Figure 6:
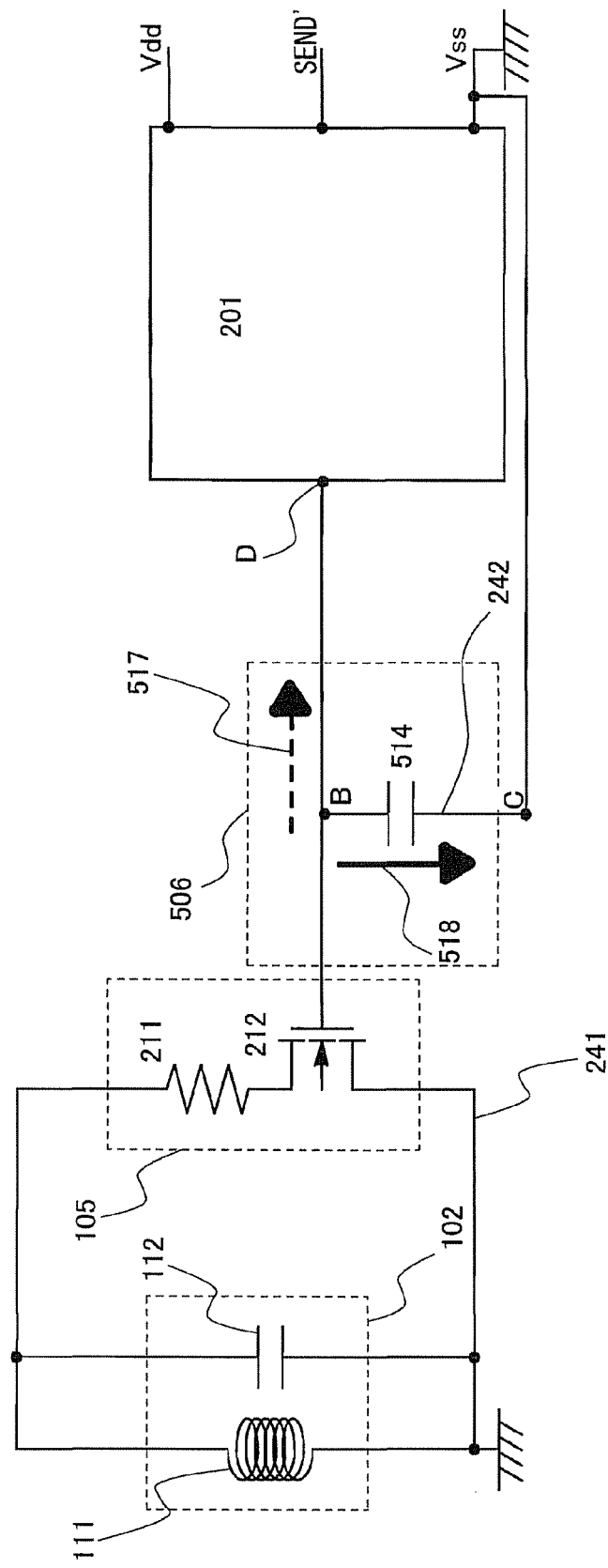
FIG. 6 illustrates a peripheral circuit of an antenna of a semiconductor device according to an embodiment of the present invention.

The way in which the AC leakage 234 flows in a structure shown in FIG. 5 is described with reference to FIG. 6. The AC leakage 234 can flow to a route BC, which is newly provided, and a route BD. However, the AC leakage 234 is allowed to flow easily to the newly provided route BC in such a manner that the impedance between B and C is set lower than the impedance of the circuit 201. Then, the capacitor 514 is provided between B and C in the filter circuit 506; thus, an AC leakage 518 flowing into the route BC is more than an AC leakage 517 flowing into the circuit 201 through the route BD.

A reactance element such as a capacitor 514 is provided between B and C; thus, the AC leakage 518 flowing into the route BC is not consumed as power which is not involved in driving or the like of the semiconductor device.

As described above, the AC leakage 234 is allowed to flow more to the additional route BC than to the route BD; thus, power consumption which is not involved in driving or the like of the semiconductor device is reduced. Therefore, power saved by improving the efficiency of power consumption (power which would be consumed as a leakage current) is used as driving power for communication, so that the maximum communication distance and the number of objects simultaneously identified can be increased.

Note that a wiring 241 is a first constant-voltage power supply line. The wiring 242 is a second constant-voltage power supply line. Although not shown in the drawings, the first constant-voltage power supply line and the second constant-voltage power supply line may be electrically connected to each other.

Embodiment 2

Figure 7:
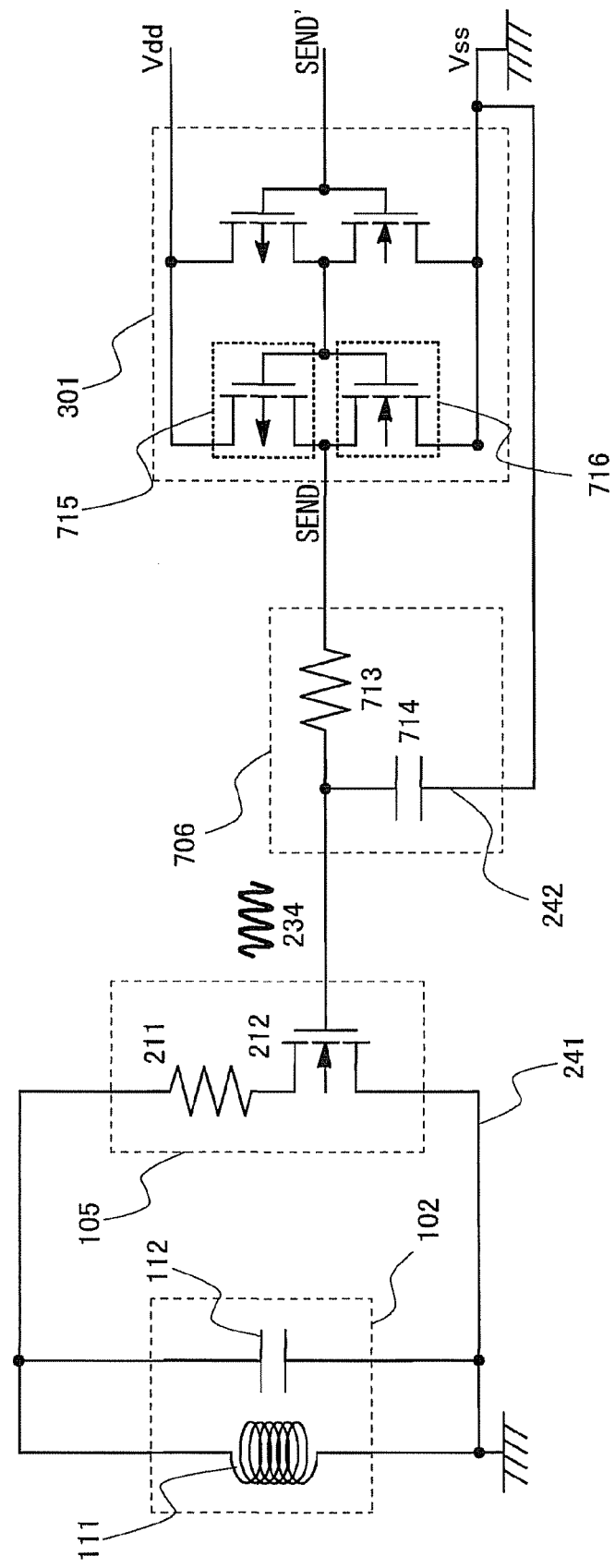
FIG. 7 is a peripheral circuit diagram of an antenna of a semiconductor device according to an embodiment of the present invention.

FIG. 7 is a peripheral circuit diagram of the antenna included in the semiconductor device according to an embodiment of the present invention. The antenna circuit 102, a modulation circuit 105, a filter circuit 706, and a circuit 301 are illustrated. Note that the circuit 301 is a circuit of an output portion of a logic circuit.

Additionally, in the semiconductor device according to this embodiment, the structure is particularly preferable when the impedance of the circuit 301 (the impedance of a SEND terminal of the circuit 301) is low. However, the semiconductor device according to this embodiment is not necessarily used only in the case where the impedance of the circuit 301 is low, and the semiconductor device according to this embodiment can be used in any cases.

Note that a logic circuit generally has a circuit structure in which the impedance of the output terminal is made to be low in many cases. In an embodiment of the present invention, also the circuit 301 is not limited to a circuit structure of a CMOS inverter or the like and any circuit structures are acceptable as long as it has the above logic circuit structure.

In this embodiment, a structure of a buffer portion in which two stages of CMOS inverters are connected is used in the circuit 301 as an example of the case where the impedance of the circuit 301 is low.

In this case, either a P-channel transistor 715 or an N-channel transistor 716 of the last stage inverter of the circuit 301 (an inverter, which is directly connected to the filter circuit 706) is in an on state at all times; therefore, the impedance of the output terminal of the CMOS inverter is kept low. Therefore, it is easier that the AC leakage 234 flows into the output terminal of the CMOS inverter. When the AC leakage flows into a transistor of the CMOS inverter which is in an on state, extra power is consumed.

Note that the impedance of the output terminal of the logic circuit is the impedance of either the P-channel transistor 715 or the N-channel transistor 716 of the last stage inverter of the circuit 301 (the inverter, which is directly connected to the filter circuit 706) which is in an on state. The impedance of either the P-channel transistor 715 or the N-channel transistor 716 which is in an off state is extremely higher than the impedance of the transistor which is in an on state; therefore, the AC current hardly flows into the transistor which is in an off state, so that the AC current flowing into the transistor which is in an off state does not need to be considered.

In other words, the impedance of the SEND terminal of the circuit 301 is controlled by either the P-channel transistor 715 or the N-channel transistor 716 which is in an on state. That is to say, the impedance of either the P-channel transistor 715 or the N-channel transistor 716 which is in an on state is the impedance of the SEND terminal of the circuit 301.

Therefore, in the case where the impedance of the SEND terminal of the circuit 301 is such low impedance, a structure according to this embodiment is preferably used.

In the case where the semiconductor device 100 transmits data such as a response signal outside, the logic circuit 101 inputs a response signal 233 into the modulation circuit 105. Depending on what a modulation system is applied to the semiconductor device 100, a modulated sub-carrier wave which is made by superposing the response signal 233 on a sub-carrier wave is input into the modulation circuit 105 instead of this response signal 233 in some cases; however, they are regarded as the same in this embodiment. In FIG. 7, the response signal 233 is input from the SEND terminal of the circuit 301 to the modulation circuit 105 through the filter circuit 706.

The modulation circuit 105 is a load modulation circuit which is connected to the antenna circuit 102, and changes the impedance between the two terminals of the antenna 111 in accordance with the level of the input signal. Thus, for example, a voltage level of a carrier wave of the antenna in the outside device which is electromagnetically coupled with the antenna 111 is changed in a wireless communication system with an electromagnetic induction method, and a current level of a carrier wave reflected on the antenna 111 is changed in a wireless communication system with an electric wave method. The R/W recognizes data transmitted by the logic circuit 101 by detecting and analyzing the changed voltage level or current level of the carrier wave.

The modulation circuit 105 includes a resistor 211 and a transistor 212 as shown in FIG. 7. In the modulation circuit 105, the antenna circuit 102 and one terminal of the resistor 211 are connected to each other and the other terminal of the resistor 211 provided in the modulation circuit 105 and one of a source and a drain of the transistor 212 are connected to each other.

The filter circuit 706 includes a resistor 713 and a capacitor 714. The filter circuit 706 has a structure in which the gate of the transistor 212 is electrically connected to one terminal of the capacitor 714 and one terminal of the resistor 713. The other terminal of the resistor 713 is connected to the SEND terminal of the circuit 301. The other terminal of the capacitor 714 is connected to the wiring 242. In other words, a structure is used in which a resistor is provided in addition to the capacitor in the filter circuit 506 according to a structure shown in FIG. 5 so that an AC leakage 234 is prevented from flowing into the circuit 301 through a gate of the transistor 212 and the SEND terminal of the circuit 301.

In addition, since the response signal 233 output by the logic circuit 101 flows through the resistor 713, it is preferable that the impedance of the resistor 713 be made high so that the response signal 233 is not influenced.

Specifically, when the resistor 713 has impedance which does not influence the response signal 233, there is no limit of the impedance value.

Although an element having any impedance is acceptable as the capacitor 714, it is preferable to use, as the capacitor 714, an element having impedance which is at least lower than the combined impedance of the resistor 713 and the SEND terminal of the circuit 301. It is further preferable to use, as the capacitor 714, an element having impedance which is lower than the impedance of the resistor 713, and there is no limitation as long as the element is the above element.

Moreover, as compared with the filter circuit 506 which does not include a resistor described in Embodiment 1, the capacitance of the capacitor in the filter circuit 706 described in this embodiment can be reduced. Therefore, higher impedance of the capacitor 714 makes it possible to use a capacitor having a small area and to make the filter circuit compact, so that the semiconductor device 100 can be highly integrated.

Figure 8:
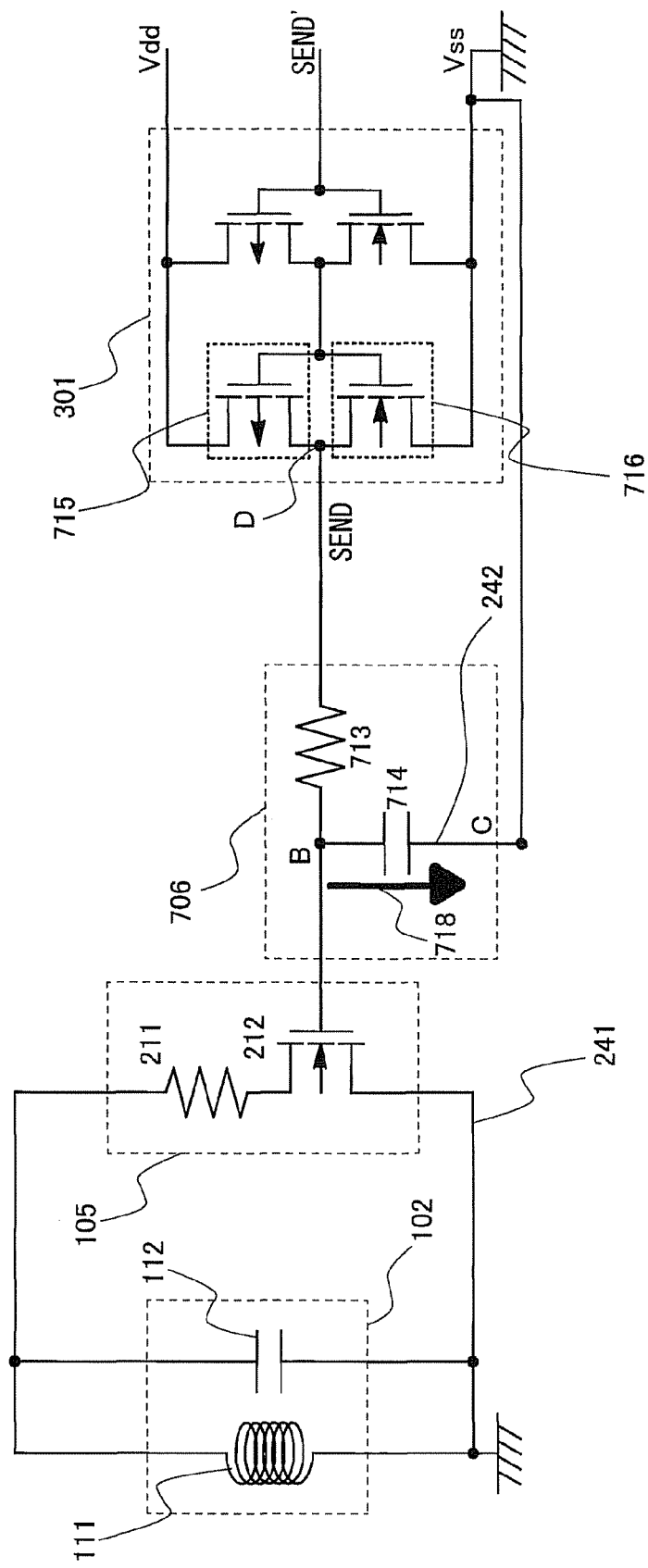
FIG. 8 illustrates a peripheral circuit of an antenna of a semiconductor device according to an embodiment of the present invention.

How the AC leakage 234 flows in a structure shown in FIG. 7 is illustrated with reference to FIG. 8. In structures shown in FIGS. 7 and 8, the resistor 713 is provided in the filter circuit 706; thus, the AC leakage 234 is more likely to flow into a route BC, which is an additional route. Most of the generated AC leakage flows between B and C; therefore, the AC leakage 234 hardly flows into the circuit 301 through the route BD and is not consumed as power which is not involved in driving or the like of the semiconductor device. Note that an AC leakage which is the AC leakage 234 flowing into the route BC is referred to as an AC leakage 718.

Even if the impedance of the SEND terminal of the circuit 301 is low, a large gap of the impedance is generated between the impedance between B and C and the impedance of the SEND terminal of the circuit 301 of the route BD when the resistor 713 is provided between B and D; therefore, most of the AC leakage 234 can flow to the route BC.

Note that the impedance can be easily modified with the use of the resistor. The resistor which has high impedance is also compact; thus, the resistor is effectively used between the route BD.

A reactance element such as a capacitor 714 is provided between B and C; thus, the AC leakage 718 flowing into the route BC is not consumed as power which is not involved in driving or the like of the semiconductor device. In other words, most of the AC leakage 234 is not consumed as power which is not involved in driving or the like of the semiconductor device.

The capacitor 714 may have lower impedance than the combined impedance of the resistor 713 and the SEND terminal of the circuit 301, or more preferably have lower impedance than the impedance of the resistor 713.

Consequently, the AC leakage 234 flows more to the route BC which is an additional route than to a route along which the AC leakage flows to the SEND terminal of the circuit 301 through the route BD. Furthermore, when the AC leakage flows between B and C, it flows into the capacitor 714 which does not consume power. Therefore, power consumption which is not involved in driving or the like of the semiconductor device is reduced, and power saved by improving the efficiency of power consumption (power which would be consumed as an AC leakage) is used as driving power, so that the maximum communication distance and the number of objects simultaneously identified can be increased.

Figure 9:
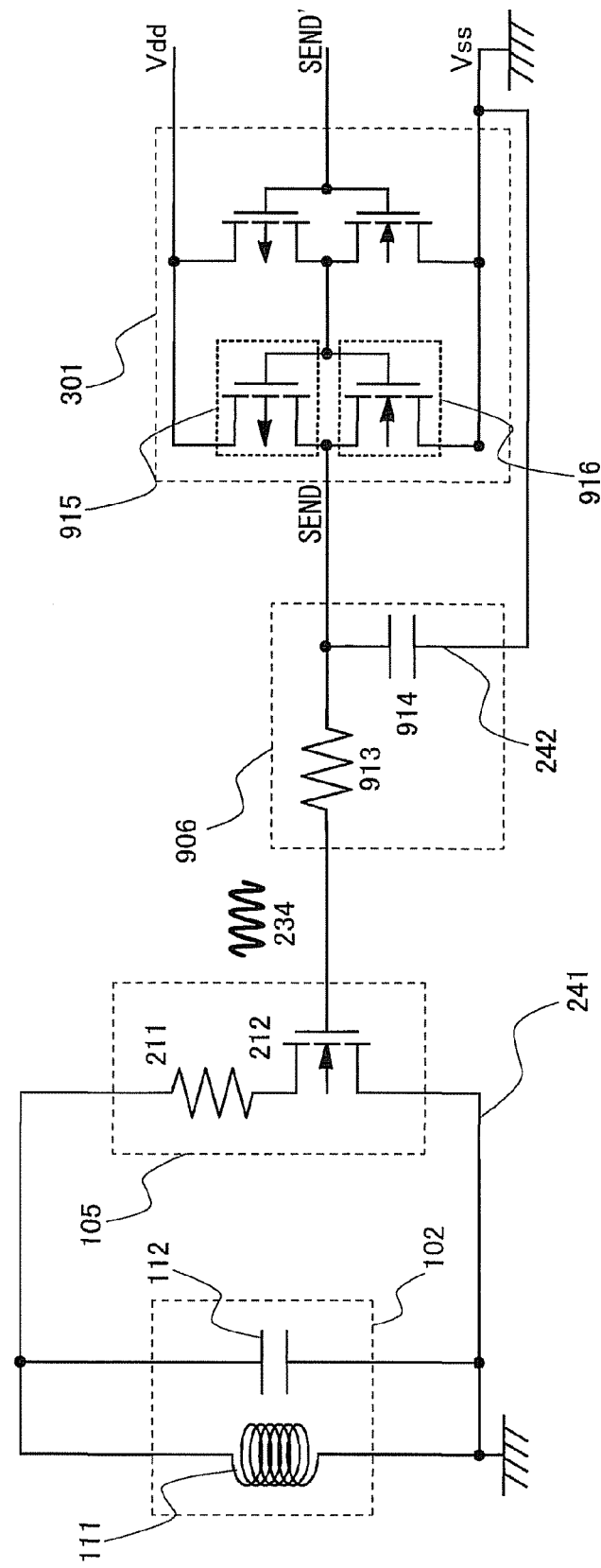
FIG. 9 is a peripheral circuit diagram of an antenna of a semiconductor device according to an embodiment of the present invention.

In FIG. 9, a filter circuit 906 is provided in which a gate of the transistor 212 is electrically connected to one terminal of a resistor 913, the other terminal of the resistor 913 is electrically connected to a SEND terminal of the circuit 301 and one terminal of a capacitor 914, and the other terminal of the capacitor 914 is connected to the wiring 242, instead of the filter circuit 706.

Figure 10:
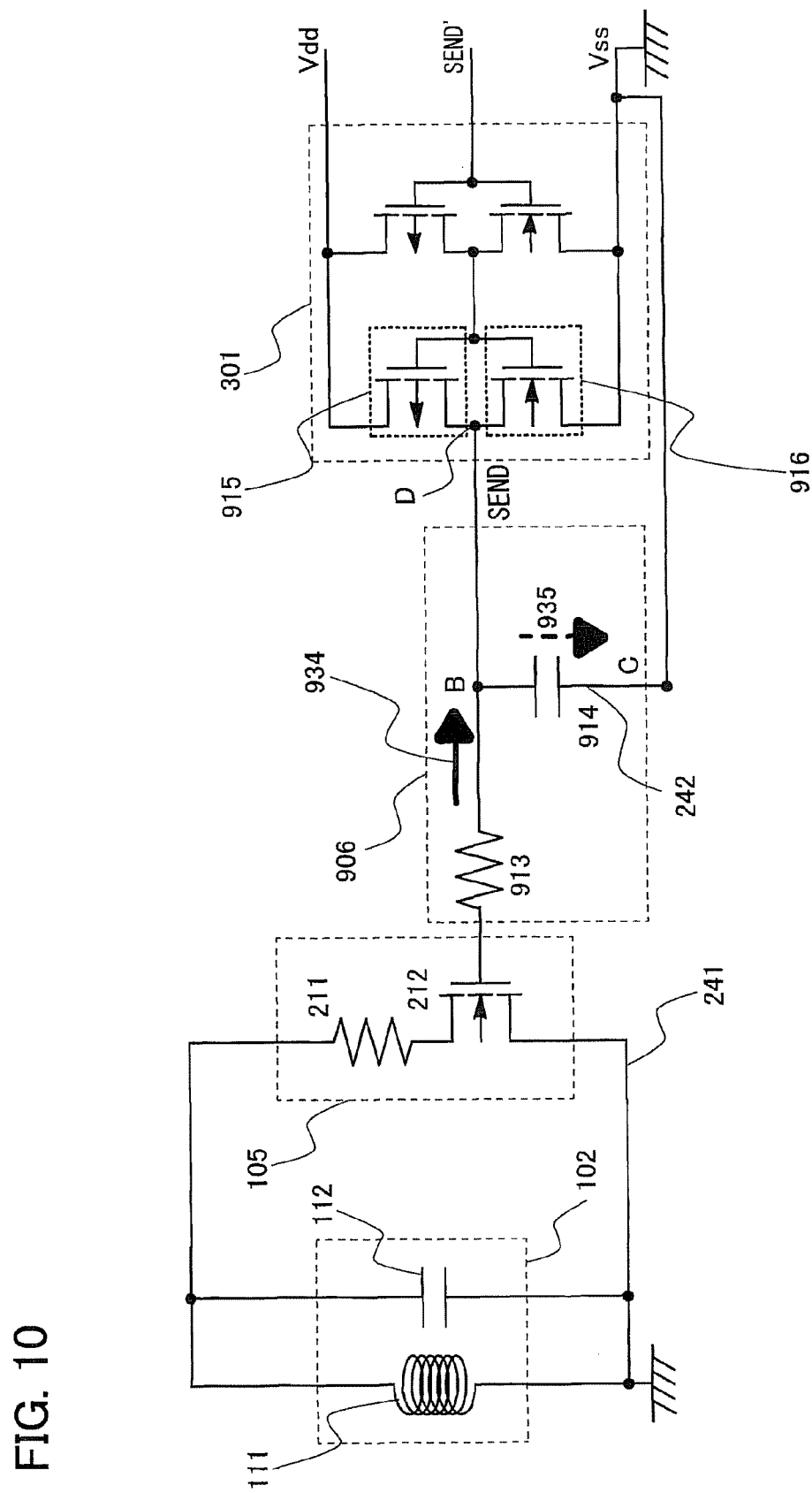
FIG. 10 illustrates a peripheral circuit of an antenna of a semiconductor device according to an embodiment of the present invention.

How an AC leakage 934 (the AC leakage 234) flows in a structure shown in FIG. 9 is illustrated with reference to FIG. 10. In the filter circuit 906, the impedance between the route BC which is an additional route is provided so as to be lower than the impedance of the SEND terminal of the circuit 201 of the route BD. Therefore, the filter circuit 906 is provided with a reactance element such as the capacitor 914 between B and C so that the AC leakage 934 is likely flow into the route BC. Note that an AC leakage which is the AC leakage 234 passing through the resistor 913 is referred to as the AC leakage 934. Additionally, an AC leakage which is the AC leakage 934 flowing into the route BC is referred to as an AC leakage 935.

The AC leakage 234 becomes the AC leakage 934 which passes through the resistor 913 and flows into the route BC which is an additional route. In other words, the AC leakage 234 is consumed by the resistor 913 as power which is not involved in driving or the like of the semiconductor device, and becomes the AC leakage 934. Furthermore, the AC leakage 934 flows to the route BC which is the additional route and to the route BD.

Also in a structure of the filter circuit shown in FIG. 9, the AC leakage 935 flowing into the route BC flows into the capacitor 914. Therefore, the AC leakage 935 is not consumed as power which is not involved in driving or the like of the semiconductor device. The power consumption which is not involved in driving or the like of the semiconductor device is reduced.

Note that a wiring 241 is a first constant-voltage power supply line. The wiring 242 is a second constant-voltage power supply line. Although not shown in the drawings, the first constant-voltage power supply line and the second constant-voltage power supply line may be electrically connected to each other.

Note that the circuit diagram in which the other terminal of the capacitor 914 is electrically connected to the wiring 242 is described as an example in this embodiment. However, the present invention is not particularly limited to this. It is acceptable as long as the other terminal of the capacitor 914 is connected to a wiring, except for the wiring 242 to which a constant voltage is supplied at all times.

Figure 15:
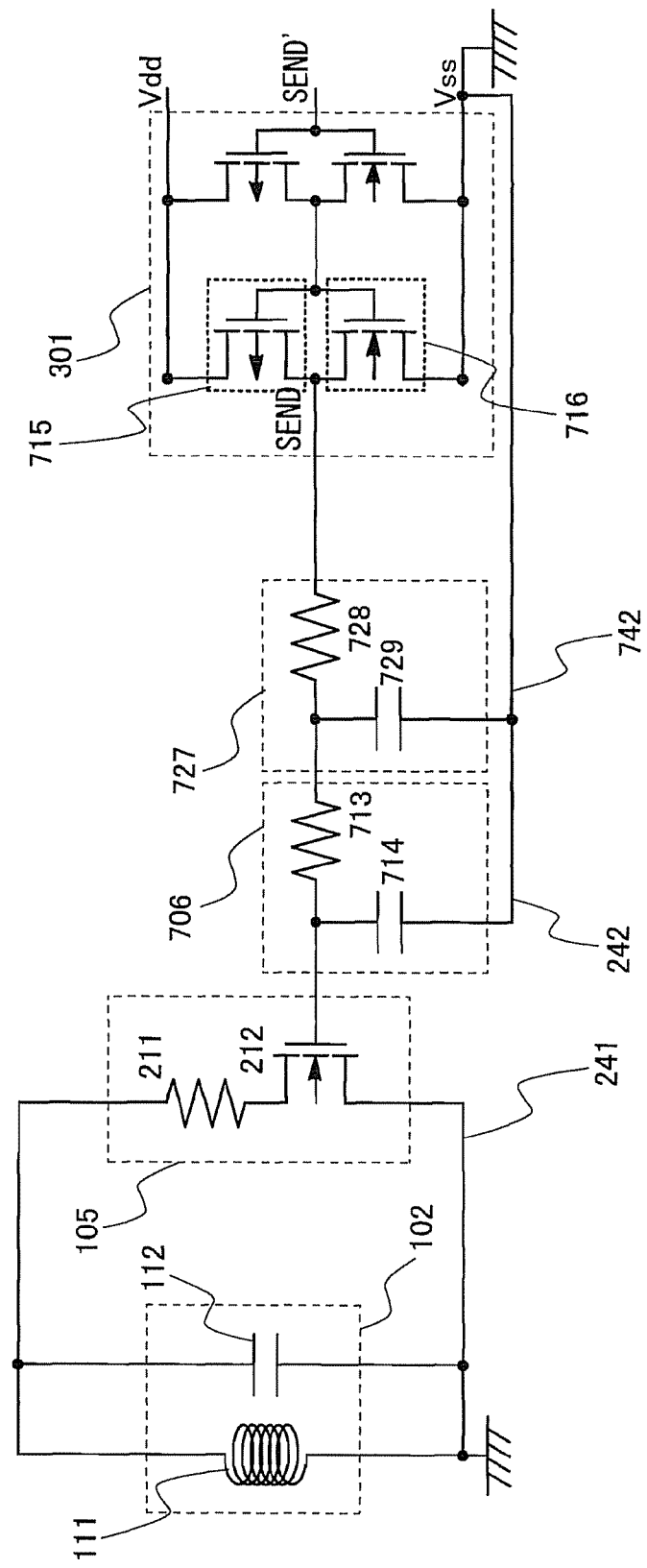
FIG. 15 is a schematic diagram of a peripheral circuit of an antenna of a semiconductor device according to an embodiment of the present invention.

Note that the filter circuit 706 which is an embodiment of the present invention may have a cascade connection so as to have a plurality stages. FIG. 15 is a circuit diagram in which two filter circuits of the filter circuit 706 and a filter circuit 727 each of which is an embodiment of the present invention are connected in series, for example. The filter circuits are connected in series; thus, the AC leakage 234 can be more prevented from flowing into an element like a logic circuit 301 including a transistor or the like.

This embodiment can be combined with any of the other embodiments and example.

Embodiment 3

The structure of a transistor used for the above semiconductor device will be described here.

Various types of transistors can be used as a transistor included in the above semiconductor device. In other words, there is no limitation on the type of a transistor which can be used. Therefore, a thin film transistor including a semiconductor layer typified by a silicon layer, a transistor formed using a semiconductor substrate or an SOI substrate, a MOS transistor, a junction transistor, a bipolar transistor, a transistor including an organic semiconductor or carbon nanotube, or other transistors can be used. Note that the semiconductor layer may contain hydrogen or halogen.

Also in the case where a thin film transistor is used as a transistor included in the above semiconductor device, various modes can be used. For example, a top-gate TFT such as a planar TFT, a bottom-gate TFT (typically an inverted staggered TFT), or the like can be used. However, this embodiment is not limited to these examples.

When a transistor included in the above semiconductor device is formed, the transistor can be formed using a silicon wafer or an SOI substrate; however, an embodiment of the present invention is not limited to this.

An SOI substrate can be fabricated in such a manner that hydrogen ions, noble gas ions such as helium ions, and halogen ions are implanted to a single crystal silicon substrate by ion implantation or the like so as to form a brittle layer in the single crystal silicon substrate, an insulating substrate formed using glass, quartz, or the like is superposed on the single crystal silicon substrate in which the brittle layer is formed, and the superposed insulating substrate and single crystal silicon substrate are heated, so that a part of the single crystal silicon substrate superposed on the insulating substrate is separated along the brittle layer. A transistor included in the semiconductor device may be formed using this SOI substrate; however, an embodiment of the present invention is not limited to this.

In addition, the above semiconductor device is formed using a flexible substrate; thus, the semiconductor device can also be applied to a flexible semiconductor device.

The flexible semiconductor device can be fabricated in such a manner that a release layer is formed over a flexible substrate formed using plastic, resin, or the like, an element formation layer including a transistor and a display element is formed over the release layer, a flexible substrate or a flexible film is formed over the element formation layer, and the element formation layer is separated from the substrate and the release layer. The method of fabricating the flexible semiconductor device is not limited to this.

Note that, as the transistor of the semiconductor device according to the present invention, a transistor including the above semiconductor layer may be used.

Moreover, transistors of the semiconductor device according to the present invention may have the same semiconductor layer or different semiconductor layers.

This embodiment can be combined with any of the other embodiments and example.

Embodiment 4

According to an embodiment of the present invention, a semiconductor device functioning as an RF tag (hereinafter, it is referred to as also a wireless tag, a wireless chip, a wireless processor, or a wireless memory) can be formed. An applicable range of the semiconductor device according to an embodiment of the present invention is wide, and the semiconductor device can be applied to any product as long as it defines information of an object, such as the history thereof, without contact and is useful for production, management, or the like.

For example, the semiconductor device according to an embodiment of the present invention may be incorporated in bills, coins, securities, certificates, bearer bonds, containers for packages, publications, recording media, personal belongings, transportation, foods, clothes, healthcare items, household items, medicines, and electronic apparatuses. Examples of such products will be described with reference to FIGS. 11A to 11G.

The bills and coins include money in the market and include a note that is in currency in a specific area as money (cash voucher), memorial coins, and the like. The securities refer to checks, bonds, promissory notes, and the like, and can be provided with a chip 1001 including a processor circuit (see FIG. 11A).

Figure 11A:
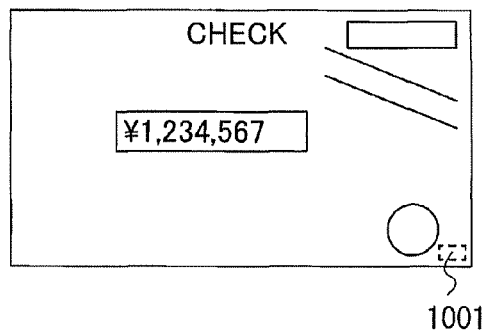
FIGS. 11A to 11G illustrate application examples of an RF tag in which a semiconductor device according to an embodiment of the present invention is used.
Figure 11B:
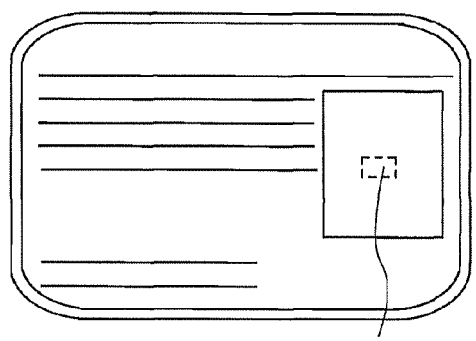
Figure 11C:
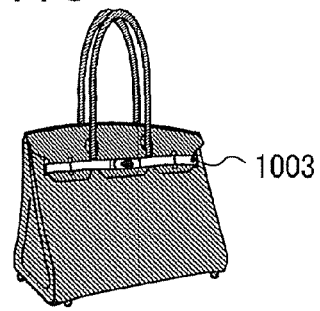
Figure 11D:
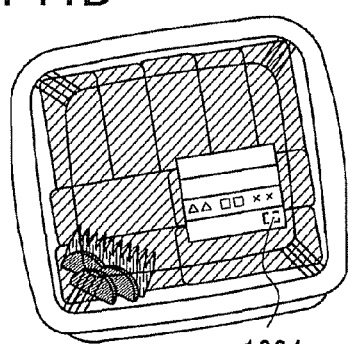
Figure 11E:
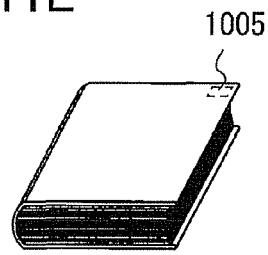
Figure 11F:
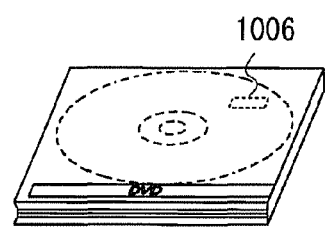
Figure 11G:
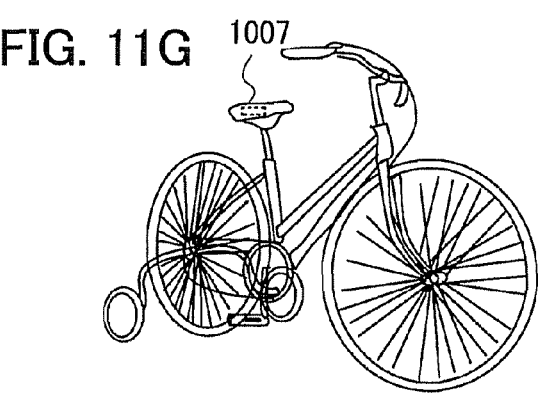

The certificates refer to drivers' licenses, certificates of residence, and the like and can each be provided with a chip 1002 including a processor circuit (see FIG. 11B). The personal belongings include bags, pairs of glasses, and the like and can each be provided with a chip 1003 including a processor circuit (see FIG. 11C).

The bearer bonds refer to stamps, rice coupons, various gift coupons, and the like. The packing containers refer to wrapping materials for food containers, plastic bottles, and the like and can each be provided with a chip 1004 including a processor circuit (see FIG. 11D). The publications refer to books and the like and can be provided with a chip 1005 including a processor circuit (see FIG. 11E). The recording media refer to DVD software, video tapes, and the like and can be provided with a chip 1006 including a processor circuit (see FIG. 11F). The transportation refers to wheeled vehicles such as bicycles, ships, and the like and can be provided with a chip 1007 including a processor circuit (see FIG. 11G). The foods include food items, beverages, and the like. The clothes refer to clothing, footwear, and the like. The healthcare items include medical instruments, health appliances, and the like.

The household items refer to furniture, lighting apparatuses, and the like. The medicines refer to medical supplies, agricultural chemicals, and the like. The electronic appliances include liquid crystal semiconductor devices, EL semiconductor devices, television sets (television receivers, thin television receivers), mobile phones, and the like.

The semiconductor device can be provided by being attached to the surface of an object or being embedded in an object. For example, in the case of a book, the semiconductor device may be embedded in a piece of paper; in the case of a package made from an organic resin, the semiconductor device may be embedded in the organic resin.

As described above, the efficiency of an inspection system, a system used in a rental shop, or the like can be improved by providing the semiconductor device in the packing containers, the recording media, the personal belongings, the foods, the clothes, the household items, the electronic apparatus, or the like. Further, by providing the semiconductor device in the transportation, the forgery or theft can be prevented. In addition, when the semiconductor device is implanted into creatures such as animals, each creature can easily be identified. For example, by implanting/attaching the semiconductor device with a sensor into a creature such as livestock, its health condition such as body temperature as well as its birth year, sex, breed, or the like can easily be managed.

Note that this embodiment can be combined with any of the other embodiments and example.

Example 1

In this example, power consumption of the semiconductor device according to an embodiment of the present invention was calculated.

As the semiconductor device according to an embodiment of the present invention, a semiconductor device having a peripheral circuit configuration of the antenna in which the filter circuit 706 is provided as shown in FIG. 7 was used. As a comparative example, a semiconductor device having a peripheral circuit configuration of the antenna in which a filter circuit is not provided shown in FIG. 2 was used.

Next, a calculation method of power consumption in an RF tag will be described. Power which corresponds to a carrier wave from a R/W was supplied through an antenna coupling of the RF tag, and current consumed in the RF tag (power consumption) was calculated by a circuit simulation of transient analysis. Note that the transistor 212 in the modulation circuit was brought into a non-conduction (off) state at all times. The frequency of an AC used in the RF tag was set to 13.56 MHz.

Figure 2:
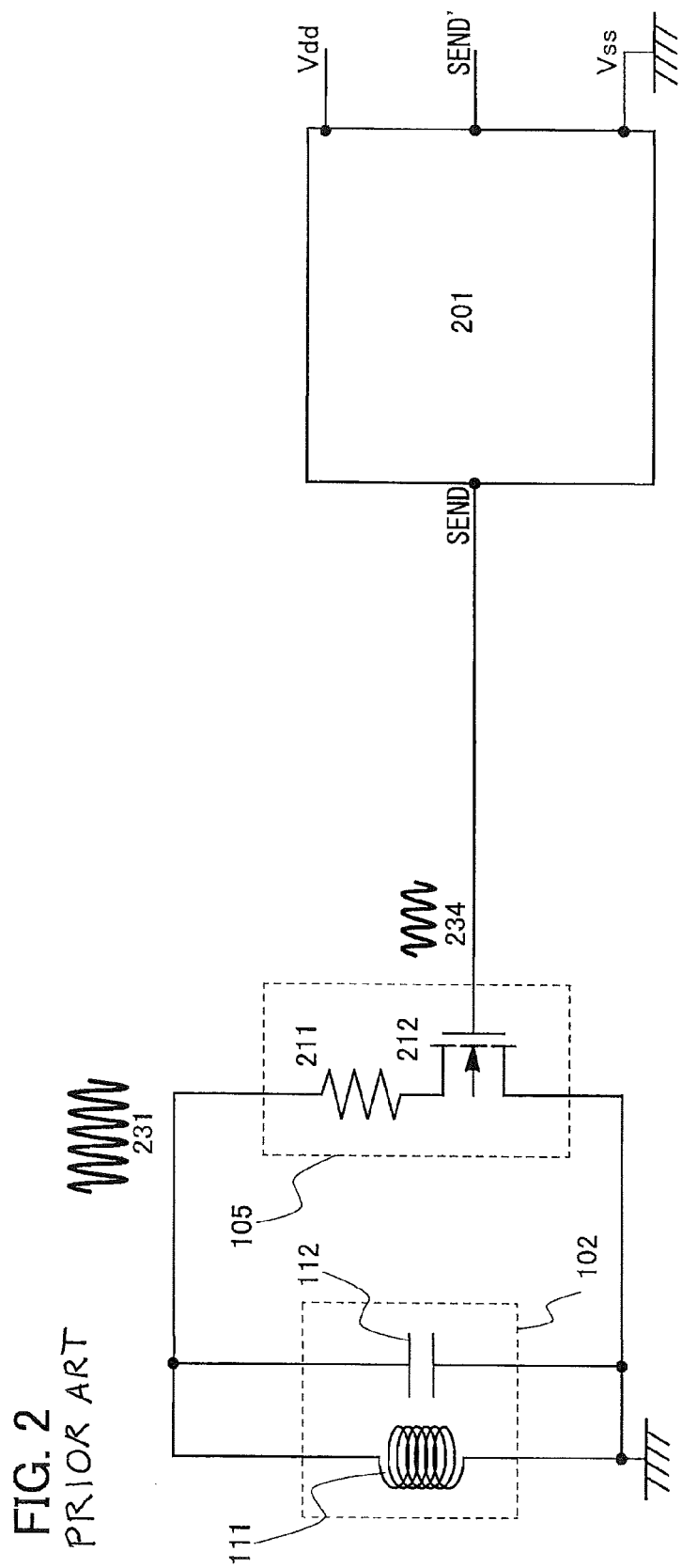
FIG. 2 is a peripheral circuit diagram of an antenna of a conventional semiconductor device.
Figure 3:
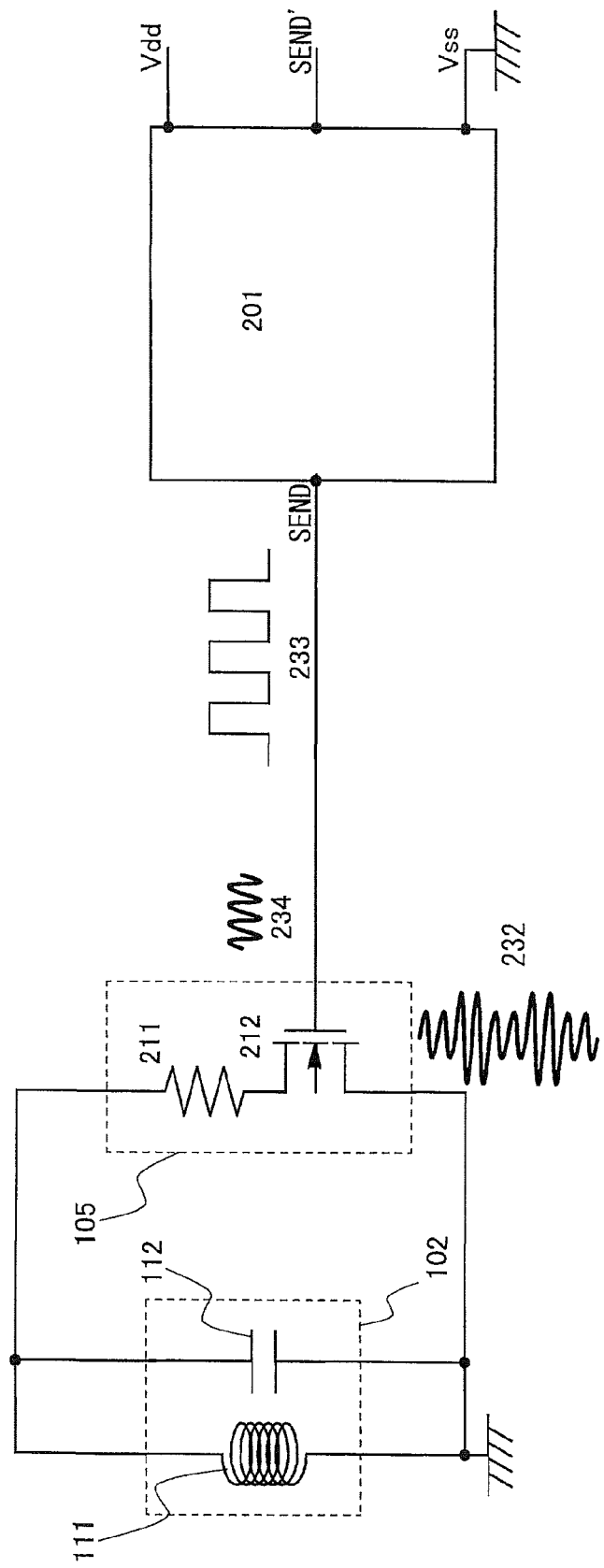
FIG. 3 is a peripheral circuit diagram of an antenna of a conventional semiconductor device.
Figure 4:
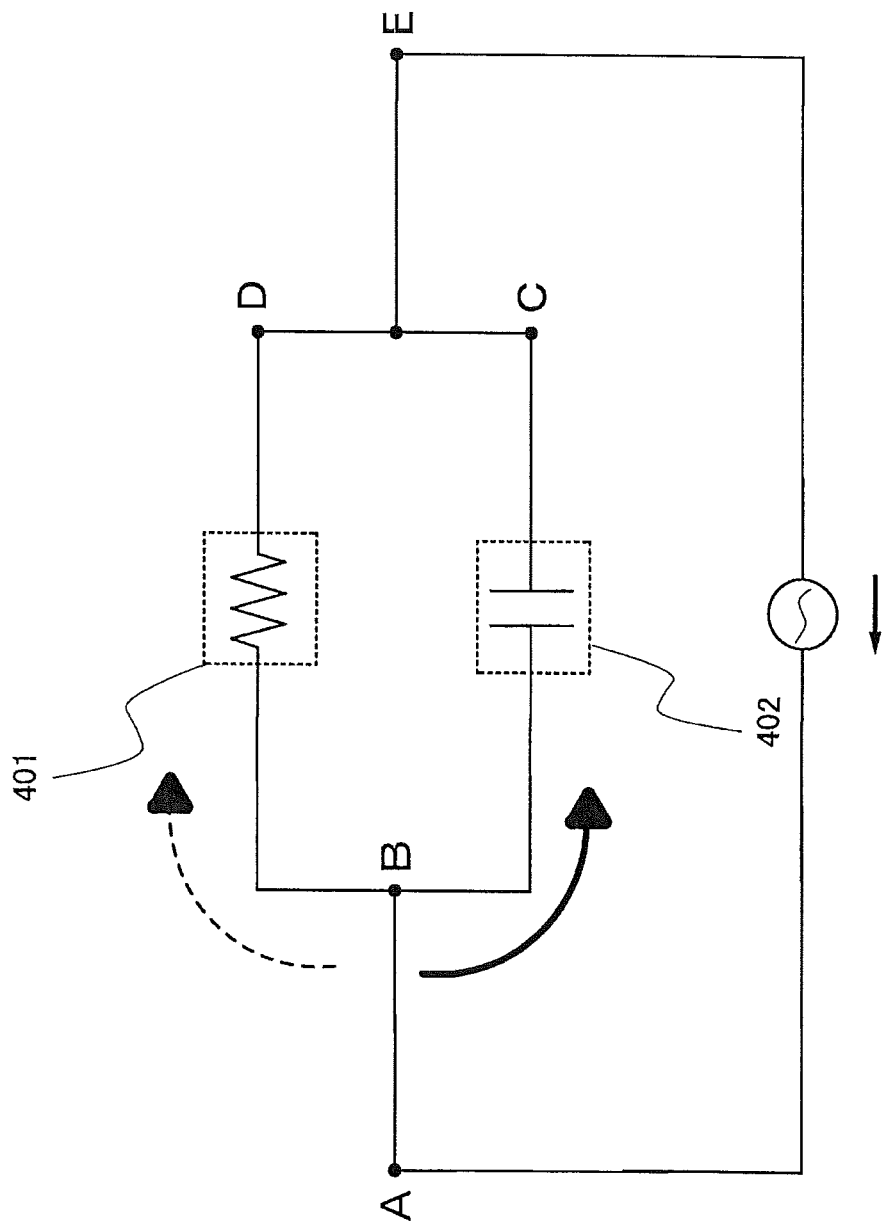
FIG. 4 shows an AC circuit.
Figure 12:
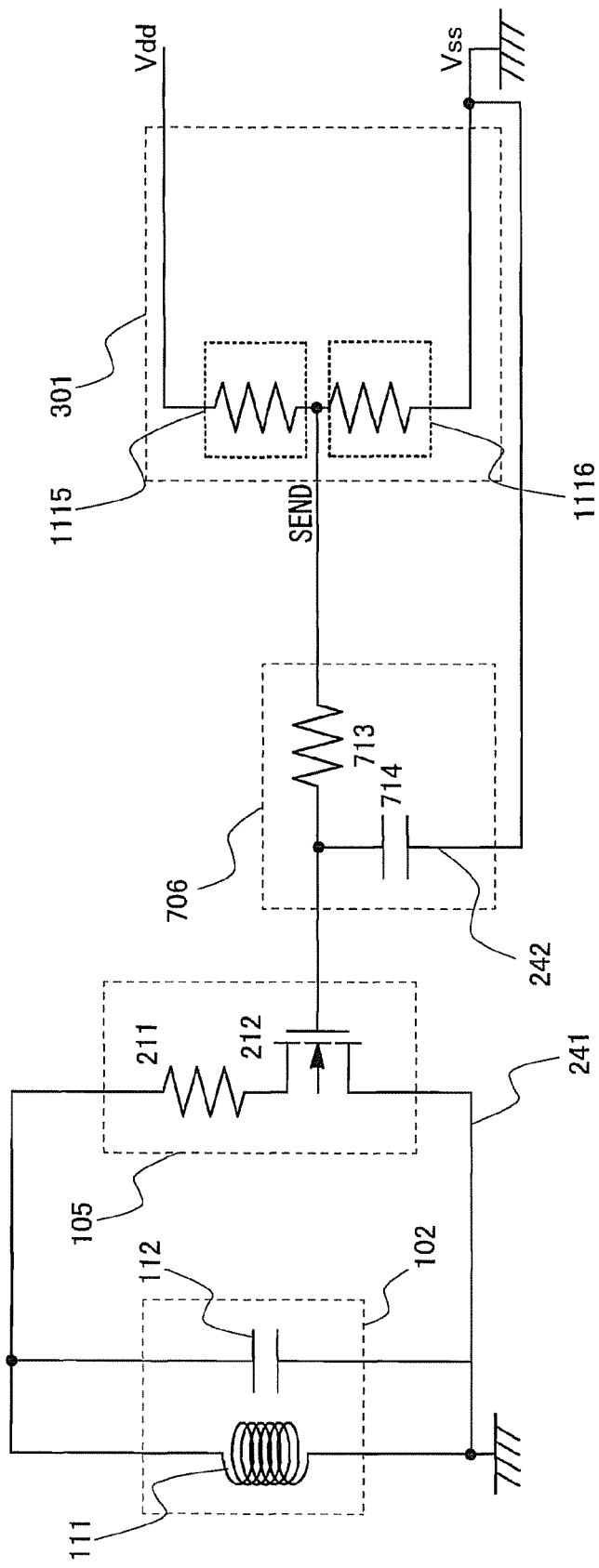
FIG. 12 is a schematic diagram of a peripheral circuit of an antenna of a semiconductor device according to an embodiment of the present invention.
Figure 13:
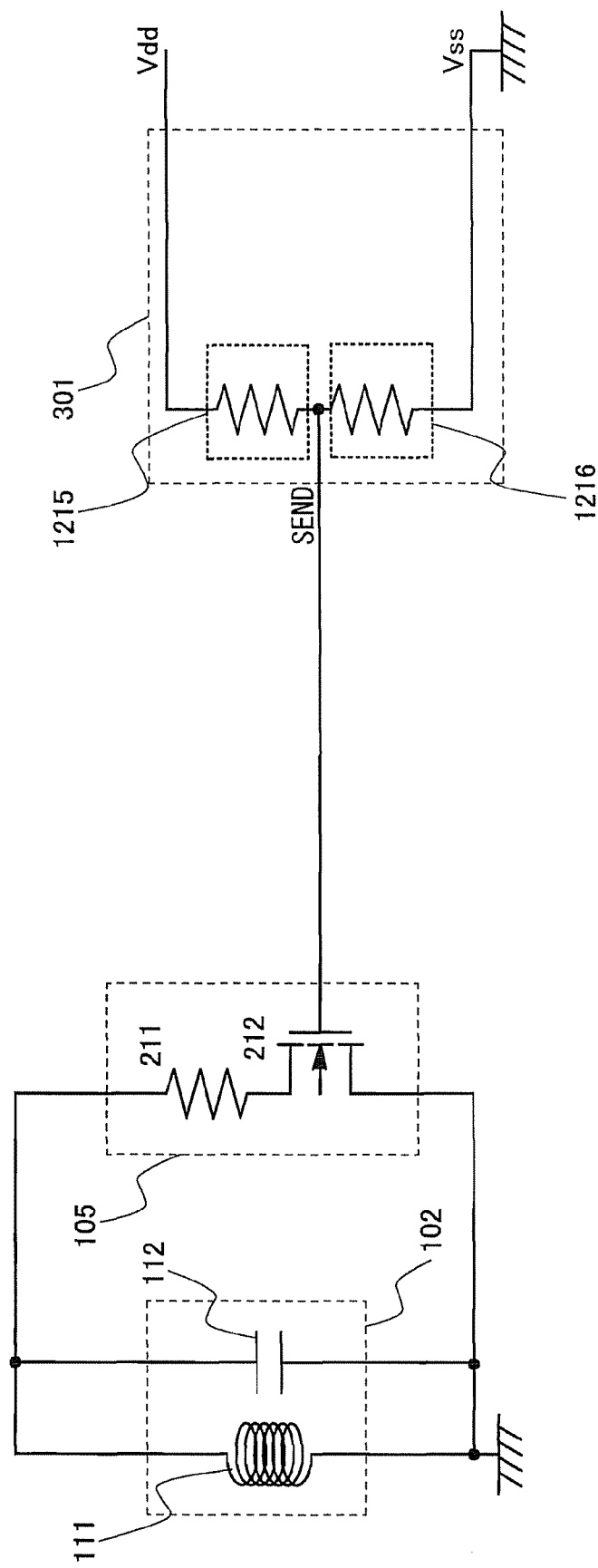
FIG. 13 is a schematic diagram of a peripheral circuit of an antenna of a semiconductor device according to an embodiment of the present invention.

FIG. 12 and FIG. 13 show equivalent circuits corresponding to FIG. 7 and FIG. 2, respectively. A transistor of an inverter of the final stage in the circuit 301 is regarded as a resistor. These equivalent circuits are useful for analyzing a route to which the AC leakage flows. The conditions of the circuit simulation in this example is that a resistor 1115 was assumed to be a resistor of around 1 GΩ, and a resistor 1116 was assumed to be a resistor of around 600 Ω.

Note that an electric capacitance of the capacitor 714 was set to 12 pF. When the frequency of the AC used in the RF tag was 13.56 MHz, the absolute value of the impedance of the capacitor 714 corresponded to around 1 kΩ. In addition, the impedance value of the resistor 713 was set to 50 kΩ. According to the above calculation conditions, FIG. 14 was calculated.

Figure 14:
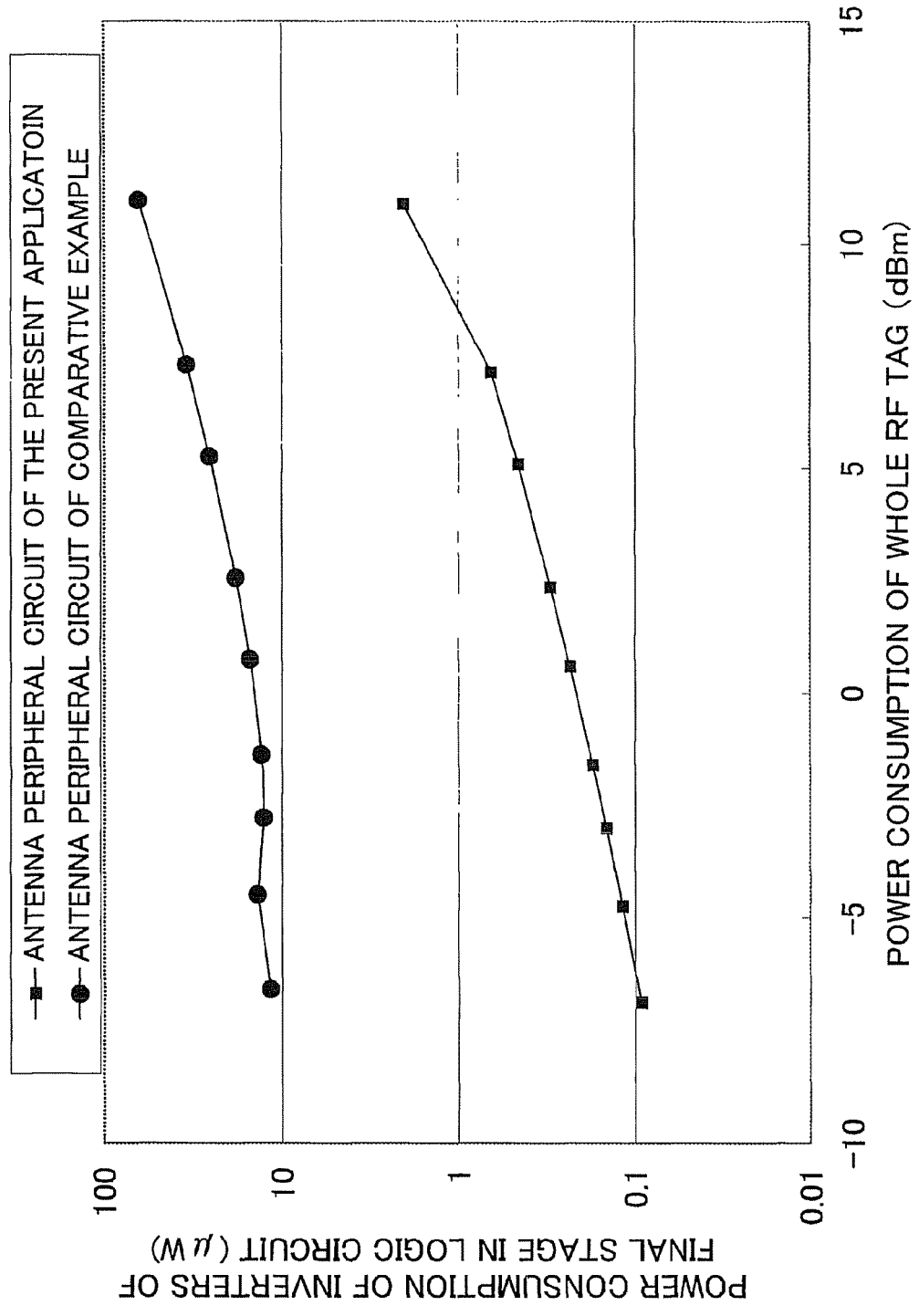
FIG. 14 is a comparative diagram showing power consumption of a logic circuit in a semiconductor device according to an embodiment of the present invention and a logic circuit of a comparative example.

FIG. 14 shows the results of calculation of power consumption of the inverters of the final stage in the logic circuit (the resistors 1115 and 1116) of the peripheral circuit of the antenna (FIG. 7 and FIG. 12 shows the circuits which include the filter circuit) in the RF tag according to an embodiment of the present invention with respect to power consumption of the RF tag according to an embodiment of the present invention, and the results of calculation of power consumption of the inverters of the final stage in the logic circuit (the resistors 1215 and 1216) of the peripheral circuit of the antenna (FIG. 2 and FIG. 13 shows the circuits which do not include the filter circuit) in the RF tag of the comparative example with respect to the power consumption of the RF tag of the comparative example. As the calculation condition, a parameter corresponding to the power consumption of the whole RF tag was changed. Note that the vertical axis in FIG. 14 is scaled logarithmically. In addition, dBm which is an unit of the horizontal axis is a value of power relative to 1 mW which is expressed in decibels.

As shown in FIG. 14, the power consumption of the final stage of the inverters in the logic circuit according to an embodiment of the present invention (the resistors 1115 and 1116) is low as compared with the power consumption of the final stage of the inverters in the logic circuit of the comparative example (the resistors 1215 and 1216). The power consumption of the final stage of the inverters in the logic circuit according to an embodiment of the present invention (the resistors 1115 and 1116) was one tenth or less of the power consumption of the final stage of the inverters in the logic circuit of the comparative example (the resistors 1215 and 1216).

Therefore, it was confirmed that the filter circuit 706 of the RF tag according to an embodiment of the present invention largely prevents the AC leakage 234 from being consumed in the final stage of the inverters in the logic circuit. As a result, the filter circuit 706 made the AC leakage 234 flow into the capacitor 714 and prevented the AC leakage 234 from flowing into the circuit 301.

The filter circuit 706 according to an embodiment of the present invention is provided; thus, the wasteful power consumption can be eliminated by preventing the AC leakage from flowing into the logic circuit according to an embodiment of the present invention, and the RF tag (the semiconductor device) achieves improvement in power consumption efficiency and power consumption reduction. Accordingly, the maximum communication distance and the number of objects simultaneously identified are increased.

Note that this example can be combined with any of the other embodiments.

This application is based on Japanese Patent Application serial no. 2010-070528 filed with the Japan Patent Office on Mar. 25, 2010, the entire contents of which are hereby incorporated by reference.

What is claimed is:

1. A semiconductor device comprising:
   an antenna circuit;
   a first resistor;
   a second resistor;
   a transistor;
   a capacitor;
   a logic circuit;
   a first constant-voltage power supply line; and
   a second constant-voltage power supply line,
   wherein one terminal of the first resistor is electrically connected to one of a source and a drain of the transistor,
   wherein the other terminal of the first resistor is electrically connected to the antenna circuit,
   wherein a gate of the transistor is electrically connected to one terminal of the capacitor and one terminal of the second resistor,
   wherein the other one of the source and the drain of the transistor is electrically connected to the first constant-voltage power supply line,
   wherein the other terminal of the second resistor is electrically connected to the logic circuit,
   wherein the other terminal of the capacitor is electrically connected to the second constant-voltage power supply line, and
   wherein impedance of the capacitor is at least lower than combined impedance of the second resistor and the logic circuit.

2. The semiconductor device according to claim 1, wherein impedance of the capacitor is lower than impedance of the second resistor.

3. The semiconductor device according to claim 1, wherein the logic circuit comprises an inverter.

4. The semiconductor device according to claim 1, wherein the transistor comprises semiconductor layer comprising silicon.

5. The semiconductor device according to claim 1, wherein the semiconductor device is a flexible semiconductor device.

6. The semiconductor device according to claim 1, wherein the semiconductor device is an RF tag.

7. A semiconductor device comprising:
   an antenna circuit;
   a first resistor;
   a second resistor;
   a transistor;
   a capacitor;
   a logic circuit;
   a first constant-voltage power supply line; and
   a second constant-voltage power supply line, wherein one terminal of the first resistor is electrically connected to one of a source and a drain of the transistor, wherein the other terminal of the first resistor is electrically connected to the antenna circuit, wherein a gate of the transistor is electrically connected to one terminal of the capacitor and one terminal of the second resistor, wherein the other one of the source and the drain of the transistor is electrically connected to the first constant-voltage power supply line, wherein the other terminal of the second resistor is electrically connected to the logic circuit, wherein the other terminal of the capacitor is electrically connected to the second constant-voltage power supply line, wherein the antenna circuit and the logic circuit are electrically connected to the first constant-voltage power supply line, and wherein impedance of the capacitor is lower than impedance of the second resistor.

8. The semiconductor device according to claim 7, wherein the logic circuit comprises an inverter.

9. The semiconductor device according to claim 7, wherein the transistor comprises semiconductor layer comprising silicon.

10. The semiconductor device according to claim 7, wherein the semiconductor device is a flexible semiconductor device.

11. The semiconductor device according to claim 7, wherein the semiconductor device is an RF tag.

12. A semiconductor device comprising:
an antenna circuit;
a first resistor;
a second resistor;
a transistor;
a capacitor;
a logic circuit;
a first constant-voltage power supply line; and
a second constant-voltage power supply line, wherein one terminal of the first resistor is electrically connected to one of a source and a drain of the transistor, wherein the other terminal of the first resistor is electrically connected to the antenna circuit, wherein a gate of the transistor is electrically connected to one terminal of the capacitor and one terminal of the second resistor, wherein the other one of the source and the drain of the transistor is electrically connected to the first constant-voltage power supply line, wherein the other terminal of the second resistor is electrically connected to the logic circuit, wherein the other terminal of the capacitor is electrically connected to the second constant-voltage power supply line, wherein the first constant-voltage power supply line and the second constant-voltage power supply line are electrically connected to each other, and wherein impedance of the capacitor is lower than impedance of the second resistor.

13. The semiconductor device according to claim 12, wherein the logic circuit comprises an inverter.

14. The semiconductor device according to claim 12, wherein the transistor comprises semiconductor layer comprising silicon.

15. The semiconductor device according to claim 12, wherein the semiconductor device is a flexible semiconductor device.

16. The semiconductor device according to claim 12, wherein the semiconductor device is an RF tag.

* * * * *